Jan. 2, 1951  W. CASTEDELLO  2,536,490
SHUTTER CONTROLLED SAFETY SWITCH
Filed Oct. 18, 1946
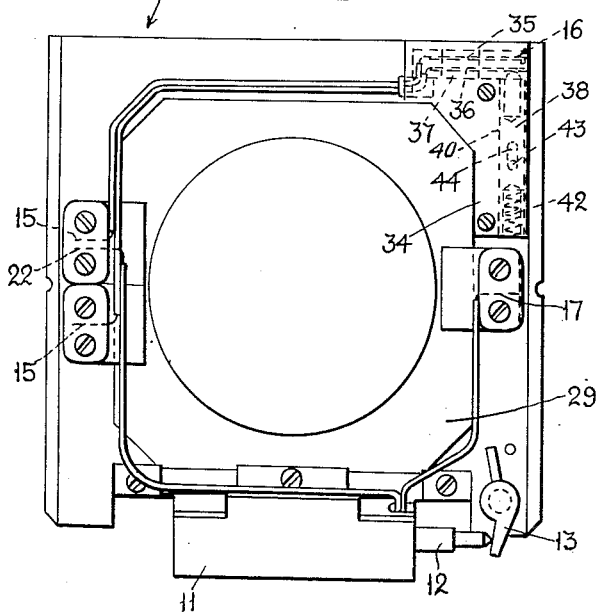
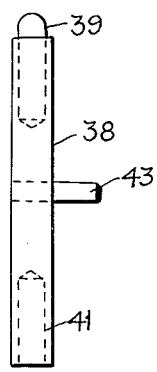
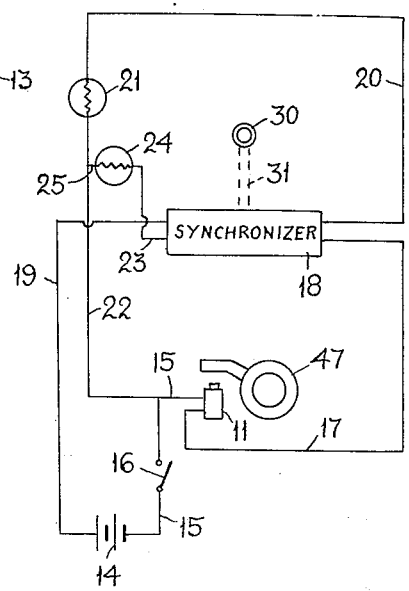
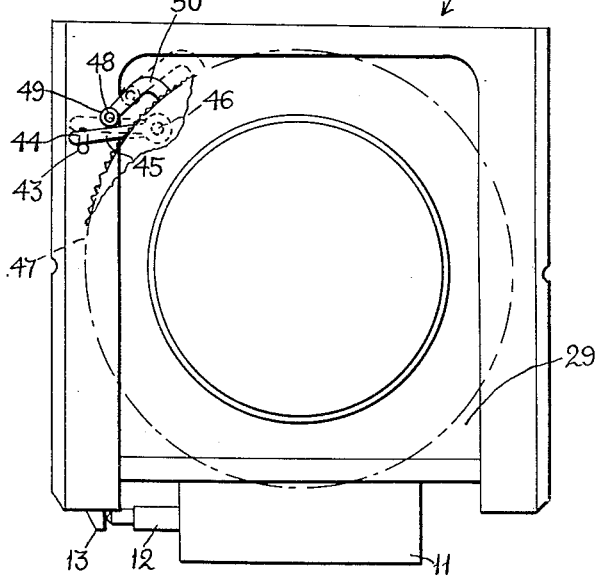
INVENTOR.
WILLIAM CASTEDELLO
BY
Frederick E. Harris
ATTORNEY Patented Jan. 2, 1951

2,536,490

UNITED STATES PATENT OFFICE 2,536,490

SHUTTER CONTROLLED SAFETY SWITCH

William Castedello, Stamford, Conn., assignor to The Kalart Company, Inc., Stamford, Conn.

Application October 18, 1946, Serial No. 704,083

4 Claims. (Cl. 95—11.5)

This invention relates to photographic apparatus, particularly to photographic cameras including or associated with electrically operated devices.

Practical experience shows that a certain number of pictures are spoiled and flash lamps wasted by an oversight on the part of the operator, when adjusting and preparing the camera for operation, for instance an operator intending to employ a flash lamp synchronized with the shutter, may forget to wind the shutter. Then, the flash lamp will be ignited when the camera release button is actuated, but the shutter will not be tripped. As a result, the flash lamp is wasted. Furthermore, the operator may not realize that the shutter was not tripped so that the picture is permanently lost.

Accordingly, one of the objects of the invention is to provide electric control means preventing an operation of any of the electrically operated devices included in or associated with a camera of the general type, above referred to, unless and until all parts of the camera are placed in a position ready for taking a picture.

Another object of the invention is to provide electric switch means for a photographic camera of the general type, above referred to, disconnecting the current supply of the electrically operated devices included in or associated with the camera unless and until all parts of the camera are ready for operation of the camera.

Another more specific object of the invention is to provide electric switch means for a photographic camera of the general type, above referred to, which switch means coact with the camera shutter so that they interrupt the circuit connections of the electrically operated devices of the camera when the camera shutter is not wound or cocked and close the same automatically when the shutter is wound.

Other and further objects, features and advantages of the invention will appear hereinafter and in the appended claims forming part of the application.

In the accompanying drawing a now preferred embodiment of the invention is shown by way of illustration and not by way of limitation.

Fig. 1 is an elevational rear view of the objective and shutter carrier of a camera of the general type, above referred to, including a shutter control mechanism according to the invention, the shutter itself being removed.

Fig. 2 is an elevational front view of the objective and shutter carrier, a fraction of the shutter being shown.

Fig. 3 is a detail view of part of the shutter control mechanism according to the invention, and Fig. 4 is a diagram of the circuit system of a camera of the general type, above referred to.

Referring now to the figures in detail, Figs. 1 and 2 show elevational views of the carrier, generally designated 10, of a camera having a drop bed. The carrier supports a lens board 29 which in turn supports shutter and objective of the camera. The means for supporting the carrier upon and adjusting the same relative to the camera bed are not shown, as is also not the outlines of the camera since these parts are not essential for the understanding of the invention. It should be noted in this connection that the usefulness of the invention is not limited to cameras of the drop bed type but that the invention can be applied to any camera including or associated with electrically operated devices.

Carrier 10, in addition to supporting lens board 29, also supports a solenoid 11 including an armature 12 employed to actuate the shutter, when energized, by turning a two-arm lever 13 connected by a linkage system (not shown) with the release mechanism of the shutter. Electro-magnetically operated shutters of the type indicated are well known in the art and need not be described here in detail. Carrier 10 further supports part of the circuit system of the camera which is diagrammatically shown on Fig. 4. According to this figure, one terminal of a source of current such as a battery 14 is connected by a lead 15 including a switch 16 to one terminal of solenoid coil 11. Armature 12 of the solenoid controls shutter 47 of the camera as indicated. The other terminal of the solenoid coil is connected by a lead 17 to a synchronizer 18 diagrammatically shown by a rectangle. The synchronizer is connected by a lead 19 to the second terminal of battery 14 and by a lead 20 to one terminal of a flash lamp 21 of any suitable design, the other terminal of which is connected by a lead 22 to supply lead 15. The synchronizer is also connected by a lead 23 to one terminal of a light unit 24 of a day and night range finder of the type described in U. S. Patent 2,397,160 to Hyman Schwartz and William Castedello, the other terminal of light unit 24 being connected by leads 25 and 22 to supply lead 15.

As is well known in the art, the purpose of the synchronizer is to cause the shutter, the flash lamp or lamps, the light unit and any other electric devices associated with the camera to operate in a definite and proper time relationship.

The synchronizer is actuated by any suitable means such as a release button 30 operatively connected with the synchronizer by mechanical transmission means 31 indicated by dotted lines.

Synchronizer 18 and the circuit system associated therewith are more fully described in United States Letters Patent 2,439,417, granted on April 13, 1948, to William Castedello. In this connection it should be noted that the invention shall not be and is not limited to circuit systems according to Fig. 4 but can be applied to various other circuit systems including systems in which the synchronizer is omitted or several flash lamps are provided.

As previously mentioned, cameras of the type herein referred to, employ a shutter which must be wound before it can be tripped by energizing solenoid 11. It will now be evident that the synchronizer will function, when actuated by means of button 30, and cause the flash lamp to be ignited and the solenoid to be energized whether or not the shutter is previously wound.

According to the invention, the loss of a picture and the waste of one or more flash lamps are prevented by including switch 16 in supply lead 15 or any other suitable part of the circuit system. As can best be seen on Fig. 1, this switch comprises two contact springs 35 and 36 supported in an insulation block 37 mounted within a corresponding recess of carrier frame 10. These contact springs are so biased that they tend to assume a disengaged position as shown on Fig. 1. It is of course also possible to provide one contact stationary and the other movable. The relative position of the contact springs is controlled by a plug or bar 38 shown in Fig. 3 in detail. Plug 38 may be made entirely of insulation material or may have an insert 39 at its end coacting with contact springs 35 and 36. The plug is inserted and guided in a corresponding recess or slot 40 of carrier 10. The axial length of slot 40 is selected so that plug 38 can be axially displaced and moves vertically relative to the axes of the contact springs. At the end of plug 38, opposite to insert 39, there is provided an axial recess 41 which receives a coil spring 42 abutting with its lower end against the bottom of recess 40. Spring 42 is so biased that it urges plug 38 toward contact springs 35 and 36, thereby causing these contact springs to engage each other, thus closing switch 16 in supply lead 15. Plug 38 is further provided with a projection or pin 43 extending through an axially elongated slot 44 of a cover plate 34 covering switch 16, part of wires 35, 36 connected therewith and block 37, as can best be seen on Fig. 2. Pin 43 is engaged by an arm or lever 45 having any suitable shape and pivoted by a pivot 46 on the face of shutter 47, part of which is indicated on Fig. 2. Arm 45, in turn coacts with shutter button 48 which may have a pin 49 extending vertically to the plane of Fig. 2 for this purpose. Arm 45 and button 48, the latter supported by an arm 50, are so positioned that the button in its rest or unwound position (shown in full lines) presses arm 45 downwardly, that it is in a counterclockwise direction, thereby causing pin 43 and with it plug 38 to be forced into its lower position, as best shown on Fig. 1. As a result, contact springs 35 and 36 are separated and battery 14 is disconnected.

When the shutter is wound by means of button 48, the button and its supporting arm 50 move into the position shown on Fig. 2 in dotted lines. The pressure by arm 45 against pin 43 is now released and loaded spring 42 can move plug 38 upwardly so that contact springs 35 and 36 are forced into engagement with each other. As a result, the circuit connection between battery 14 and the electrically operated devices is established so that the camera and the electrically operated devices are ready for operation.

While the invention has been described in detail with respect to a certain now preferred example and embodiment of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A photographic apparatus of the type described comprising electrically operated devices, in combination with a pair of switch contacts included in a circuit system for connecting said electrically operated devices to a source of current, at least one of said contacts being yieldable and biased into position disengaged from the other contact for disconnecting said circuit system, a movable member constructed and positioned to coact with the yieldable contact, spring means urging the movable member into a position causing an engagement of said contacts, and means associated with the shutter setting means constructed to retain the movable member in an inactive position against the action of said spring means when the shutter setting means is in its rest position and to release the movable member for the purposes aforesaid, when the shutter setting means is displaced in response to a winding of the shutter.

2. A photographic apparatus of the type described comprising electrically operated devices, in combination with a pair of switch contacts disposed in a recess of the objective and shutter carrier of the camera and included in a circuit system for connecting said electrically operated devices with a source of current, at least one of said contacts being yieldable and biased into a position disengaged from the other contact for disconnecting said circuit system, a member slidably supported in another recess of the carrier, a spring placed in said second recess and urging the slidable member into a position causing engagement of said contacts, and means associated with the shutter setting means constructed to retain the movable member in an inactive position against the action of said spring when the shutter setting means is in its rest position and to release the slidable member for the purposes aforesaid, when the shutter setting means is displaced in response to a winding of the shutter.

3. A photographic apparatus of the type described comprising electrically operated devices, in combination with a pair of switch contacts disposed in a recess of the objective and shutter carrier of the camera and included in a circuit system for connecting said electrically operated devices with a source of current, at least one of said contacts being yieldable and biased into a position disengaged from the other contact for disconnecting said circuit system, a member slidably supported in another recess of the carrier, a spring placed in said second recess and urging the slidable member into a position causing engagement of said contacts; a projection extending from said slidable member, and an arm pivotally supported on the camera shutter and arranged to engage said projection, said arm constructed and positioned to be engaged by the shutter setting means when the same is in its rest position and to be held by the said means in a position causing the slidable member to remain in a position disengaged from said contacts, and to be released by the shutter setting means when the shutter is wound for causing the spring to move the slidable member into a position in which said contacts engage each other, thereby rendering said circuit system operative for the purposes aforesaid.

4. A photographic apparatus with a shutter of a type set by winding and tripped by the plunger of an energized solenoid, in combination with a pair of relatively movable switch contacts connected in circuit with the shutter solenoid and a source of current, said contacts being biased into a disconnected position, a movable member engageable with said contacts for moving the same into a connected position, spring means urging the movable member into a position causing engagement of said contacts, and means associated with setting means for the shutter and constructed to retain the movable member in a position disengaged from said contacts against the action of said spring means when the shutter setting means are in an unwound position and to release the movable member for movement by the spring means in response to a displacement of the setting means for winding of the shutter.

WILLIAM CASTEDELLO.

REFERENCES CITED

The following references are of record in the file of this patent:

UNITED STATES PATENTS

| Number | Name | Date |
| --- | --- | --- |
| 1,968,597 | Blake | July 31, 1934 |
| 2,049,735 | Grogin | Aug. 4, 1936 |
| 2,071,370 | Williams et al. | Feb. 23, 1937 |
| 2,264,595 | Schwartz et al. | Dec. 2, 1941 |
| 2,358,941 | Schwarz | Sept. 26, 1944 |